US007000070B2

(12) United States Patent
Moriwaki et al.

(10) Patent No.: US 7,000,070 B2
(45) Date of Patent: Feb. 14, 2006

(54) SCALABLE DISK ARRAY CONTROLLER INTER-CONNECTION NETWORK

(75) Inventors: Norihiko Moriwaki, Hachioji (JP); Kazuhisa Fujimoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 10/341,446

(22) Filed: Jan. 14, 2003

(65) Prior Publication Data

US 2004/0083338 A1 Apr. 29, 2004

(30) Foreign Application Priority Data

Oct. 23, 2002 (JP) .............................. 2002-307790

(51) Int. Cl.
*G06F 12/00* (2006.01)
(52) U.S. Cl. ........................... 711/114; 711/113; 710/38
(58) Field of Classification Search ................ 711/113, 711/114; 710/38; 340/2.1, 2.2, 825
See application file for complete search history.

(56) References Cited

U.S. PATENT DOCUMENTS

| 6,385,681 | B1 | 5/2002 | Fujimoto et al. | |
| 6,477,619 | B1 * | 11/2002 | Fujimoto et al. | ............ 711/114 |
| 6,606,715 | B1 | 8/2003 | Kikuchi | |
| 6,757,753 | B1 | 6/2004 | DeKoning et al. | |
| 6,820,171 | B1 | 11/2004 | Weber et al. | |
| 2003/0084237 | A1 * | 5/2003 | Yoshida et al. | .............. 711/112 |
| 2003/0191891 | A1 | 10/2003 | Tanaka et al. | |
| 2003/0229757 | A1 * | 12/2003 | Hosoya et al. | ............... 711/114 |
| 2004/0083338 | A1 * | 4/2004 | Moriwaki et al. | ........... 711/114 |

FOREIGN PATENT DOCUMENTS

JP 2001-256003 3/2000

OTHER PUBLICATIONS

Manfred Liebhart et al., "A Study of an SCI Switch Fabric", Proceedings of the 5th International Workshop of Modeling, Analysis and Simulation of Computer and Telecommunications Systems, 1997 IEEE, pp. 162-169.

* cited by examiner

Primary Examiner—Matthew D. Anderson
(74) Attorney, Agent, or Firm—Reed Smith LLP; Stanley P. Fisher, Esq.; Juan Carlos A. Marquez, Esq.

(57) ABSTRACT

Disclosed herewith is a scalable disk array controller inter-connection network to be employed for a disk array system in which a plurality of disk array controllers connected to each another are expected to be operated as one disk array controller. The inter-connection network enables such disk array controllers to be added/removed without service interruption while the system reliability is kept as is. Each of the plurality of disk array controllers comprises a channel IF unit; a disk IF unit; a cache memory unit; a shared memory unit; means for connecting the channel IF unit/disk IF unit and the cache memory unit; and means for connecting the channel IF unit/disk IF unit and the shared memory unit. The inter-connection network comprises a plurality of switches to be increased in a scalable manner. Each of the switches is inter-connected with other switches with use of a redundant path having a separated physical route. In addition, each of the switches has an output destination table used to set redundant paths and switches between paths after the inter-connection network is modified due to the addition/removal of the above switches. The disk array controller becomes cost-scalable because the disk array controller units can be added/removed to/from the system as required without service interruption while the system reliability is kept as is.

12 Claims, 19 Drawing Sheets

F I G. 1 3
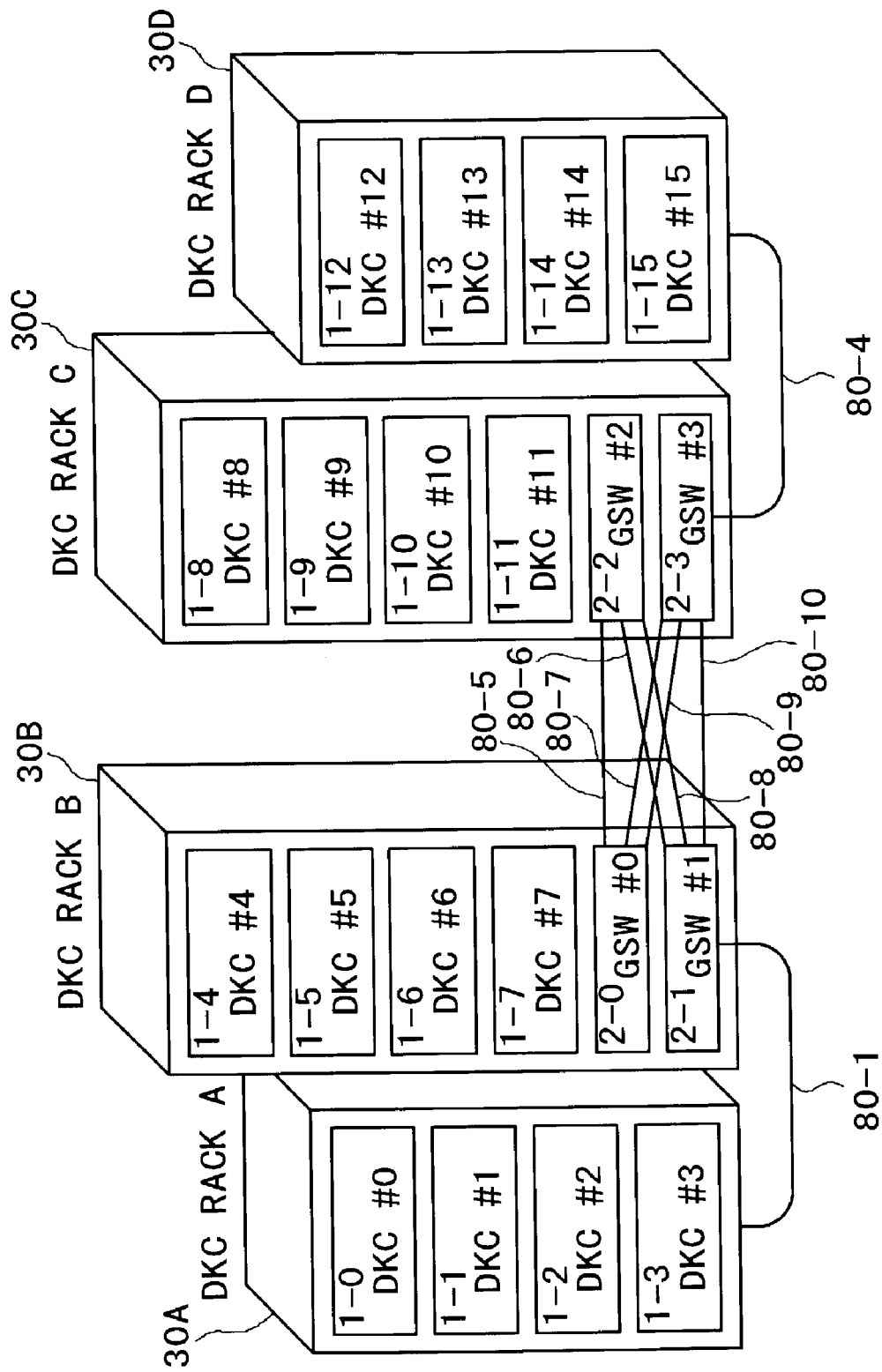

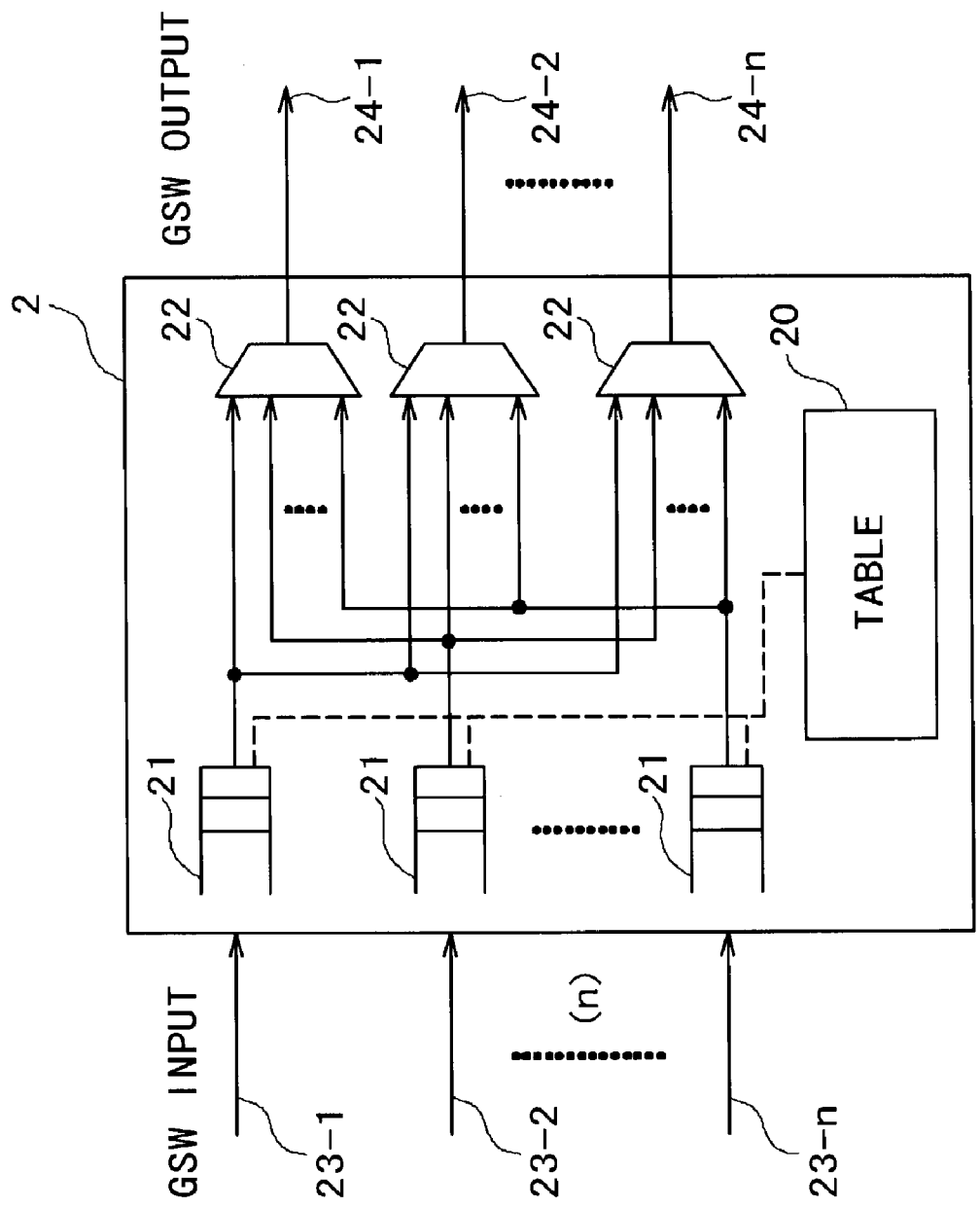

SCALABLE DISK ARRAY CONTROLLER INTER-CONNECTION NETWORK

CROSS-REFERENCE TO RELATED APPLICATIONS

This application is related to U.S. application Ser. No. 10/067,332 filed on Feb. 7, 2002, U.S. application Ser. No. 10/090,767 filed on Mar. 6, 2002 and U.S. application Ser. No. 10/222,831 filed on Aug. 19, 2002, the disclosure of which is hereby incorporated by reference.

BACKGROUND OF THE INVENTION

1. Field of the Invention

The present invention relates to a controller of a disk array apparatus configured by a plurality of magnetic disk drives used for storing data respectively.

2. Description of the Related Art

[Patent Document 1]

JP-A No. 256003/2001

Large-scale corporations such as banks, securities firms, telephone companies are now trying to reduce the costs of the operation, maintenance, and management of their computer systems and storage systems by integrating those computers and storages in a data center respectively while they have been distributed to some places so far.

In order to meet such the demands, large high-end disk array controllers are beginning to support the channel interfaces with more than one hundred host computers (connectivity) and the storages, each having a large capacity of more than several hundreds of terabytes.

On the other hand, along with the expectation that the storage area network (SAN) will spread more in the near future, small-scale disk array controllers are also coming to be required of the same enhanced high reliability as that of the large high-end disk array controllers.

As a result, each of the disk array controllers as described above has now been configured with scalability to cope with any of small-scale and large-scale configurations with the same enhanced highly reliable architecture. And, one of the methods for enabling such the disk array controller is to integrate a plurality of disk array controllers so as to operate them as one system.

FIG. 2 shows an outline of the disk array controller disclosed by JP-A No. 256003/2001 as an example of the conventional techniques for those disk array controllers. According to this conventional technique, the disk array controller comprises a plurality of disk array control units, each including a plurality of channel IF units 11 used for the data transfer between a plurality of host computers 50 and the plurality of disk array control units 1; a plurality of disk IF units 12 used for the data transfer between a plurality of magnetic disk drives 5 and the plurality of disk array control units 2; a plurality of cache memory units 14 for storing data read/to be written from/in the plurality of magnetic disk drives 5 temporarily; and a plurality of shared memory units 13 for storing control information related to the disk array control units 1 (ex., information related to the controlling of the data transfer between the channel IF units 11/disk IF units 12 and the cache memory units 14, and management information of the data to be stored in the magnetic disk drives 5). The shared memory units 13 and the cache memory units 14 can be accessed from every channel IF unit 11 and every disk IF unit 12 over the plurality of disk array control units 1. In this configuration of the disk array controller, inter-connection networks 10 and 20 are used for the connection between the channel IF units 11/disk IF units 12 and the shared memory units 13, as well as between the channel IF units 11/disk IF units 12 and the cache memory units 14 over the plurality of disk array control units 1.

FIG. 3 shows a detailed internal block diagram of a conventional disk array control unit (DKC) 1. Each disk array control unit 1 includes a plurality of SM-SWs (shared memory switches) 110, and a plurality of SM paths between units 141, through which the units 141 are connected to the inter-connection network 10. And, each disk array control unit 1 includes a plurality of CM-SWs (cache memory switches) 111, as well as a plurality of CM paths between units 142, through which the units 142 are connected to the inter-connection network 20.

As described above, the conventional disk array controller thus comes to be able to provide any of small to super large scale configurations with scalability, since a plurality of disk array control units are connected to each another through the inter-connection networks.

However, the conventional technique does not mention details of how to configure any of such the inter-connection networks while the technique can cope with any of small to super large scale configurations with scalability by connecting plurality of disk array control units through the inter-connection networks configured by switches. And, how to form such a scalable inter-connection network is very important to realize scalable disk array controllers, whether they are small or super-large in scale. In other words, a small-scale inter-connection network should be used when the number of the connected disk array control units is not so large while a large-scale inter-connection network should be used when the number of the connected disk array control unit is large. When an inter-connection network is to be scaled up/down, the scale-down/up should be made without service interruptions while the controller's reliability is kept. In addition, the unit module for configuring a scalable inter-connection network should be fabricated with as less hardware items as possible.

Under such circumstances, it is an object of the present invention to provide a scalable disk array control unit inter-connection network to realize scalable disk array controllers.

More concretely, it is an object of the present invention to provide a disk array control unit inter-connection network to/from which scalable disk array control units can be added/removed without service interruptions while the network reliability is kept so as to provide scalable disk array controllers.

It is another object of the present invention to provide an implementation method of a cost-scalable disk array control unit inter-connection network with less hardware items.

SUMMARY OF THE INVENTION

In order to achieve the above objects, the disk array controller of the present invention is provided with an inter-connection network for connecting a plurality of disk array control units, each including a channel IF unit; a disk IF unit; a cache memory unit; a shared memory unit; means for connecting the channel IF unit/disk IF unit and the cache memory unit; and means for connecting the channel IF unit/disk IF unit and the shared memory unit so as to read/write data. The inter-connection network is configured by a plurality of switches to be added in a scalable manner and each of the switches has an output path table used to form a mesh connection path with use of a redundant path having a separated physical route to other switches and set a redundant path or change the path to another after the modification of the inter-connection network. Each of the switches shares a physical link with other switches as far as possible to form paths to other switches to reduce the necessary number of physical switch ports.

Furthermore, in order to shorten the cable length for each inter-connection between switches of the scalable connection network, those two types of racks are disposed alternately. One for housing a plurality of the disk array control units. The other for housing the plurality of disk array control units and the plurality of switches.

In another aspect, the disk array controller of the present invention comprises a plurality of disk array control units (DKC), a plurality of switching units (GSW) connecting the plurality of DKCs, and a path for connecting each of the connection units to another. Each of the disk array control units includes a first interface having an interface with a host computer, a second interface unit having an interface with a first memory unit, a second memory for storing data read/to be written from/in the first memory temporarily, and a transfer path for connecting the first/second interface unit to the second memory. Each of the connection units includes a plurality of disk ports connected to the first or second interface, an inter-unit port connected to a path used to connect each of the connection units to another to transfer data, and management means for changing the correspondence between a connection unit assumed as a final device for receiving transfer data and a unit for outputting the data.

As an example, the management means has a managing table for managing the correspondence between each connection unit for receiving data and a port between units for outputting the data. For example, the managing table should preferably manage four connection units, and the managing table should preferably have at least five ports between units.

The correspondence between a destination unit and an output port changes according to the number of connected connection units. As an example, the managing table may be updated according to the number of connection units connected to each another.

These and other objects and methods for solving conventional problems will become more apparent as the description proceeds with the following embodiment and appended drawings as described below.

BRIEF DESCRIPTION OF THE DRAWINGS

FIG. 13 is another block diagram of the disk array controller to which a plurality of the disk array control units shown in FIG. 7 are connected;

FIG. 19 is an internal block diagram of the GSW 2.

DETAILED DESCRIPTION OF THE PREFERRED EMBODIMENT

Hereunder, an embodiment of the present invention will be described with reference to the accompanying drawings.

Figure 1:
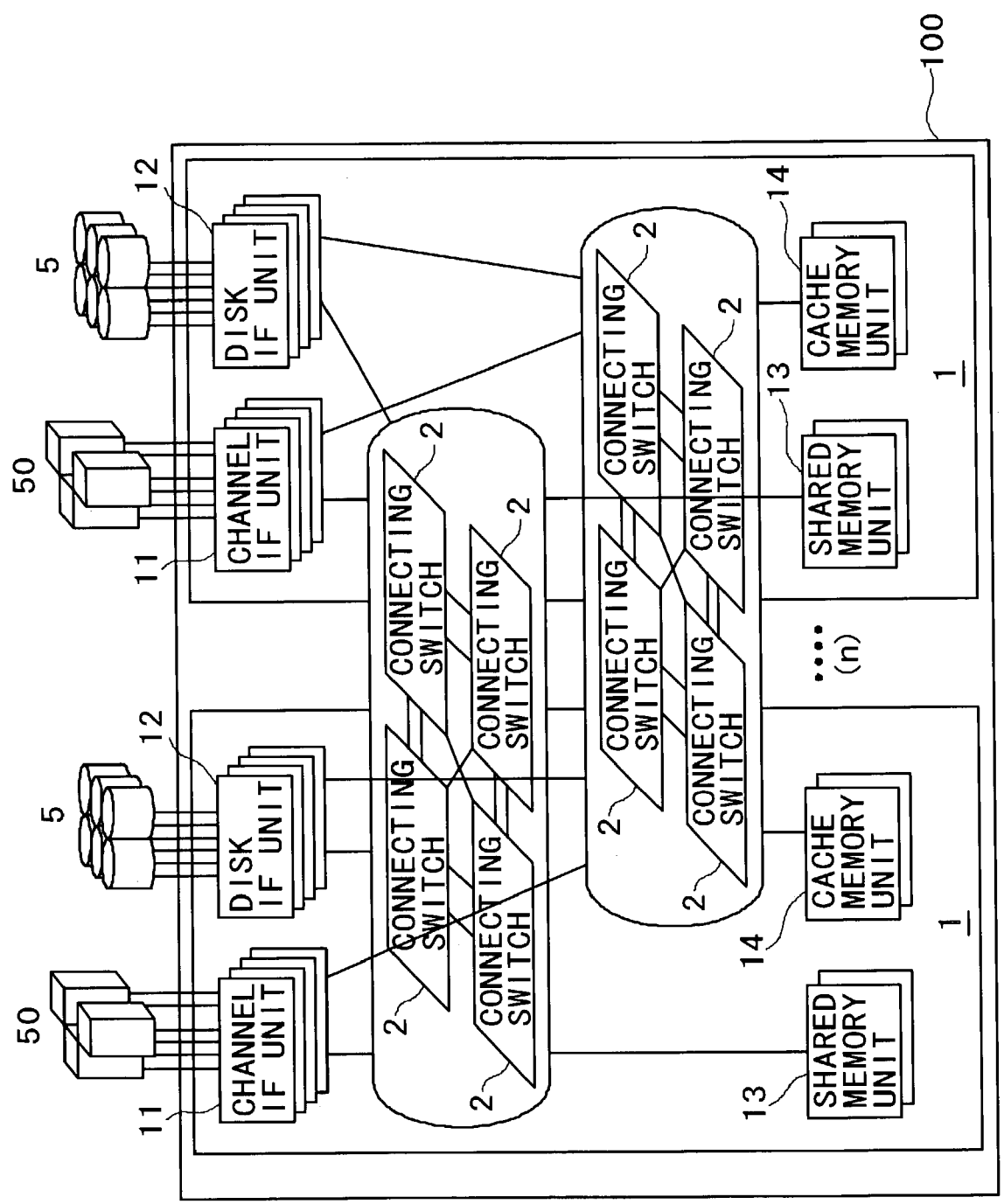
FIG. 1 is a block diagram of a disk array controller in an embodiment of the present invention.
Figure 2:
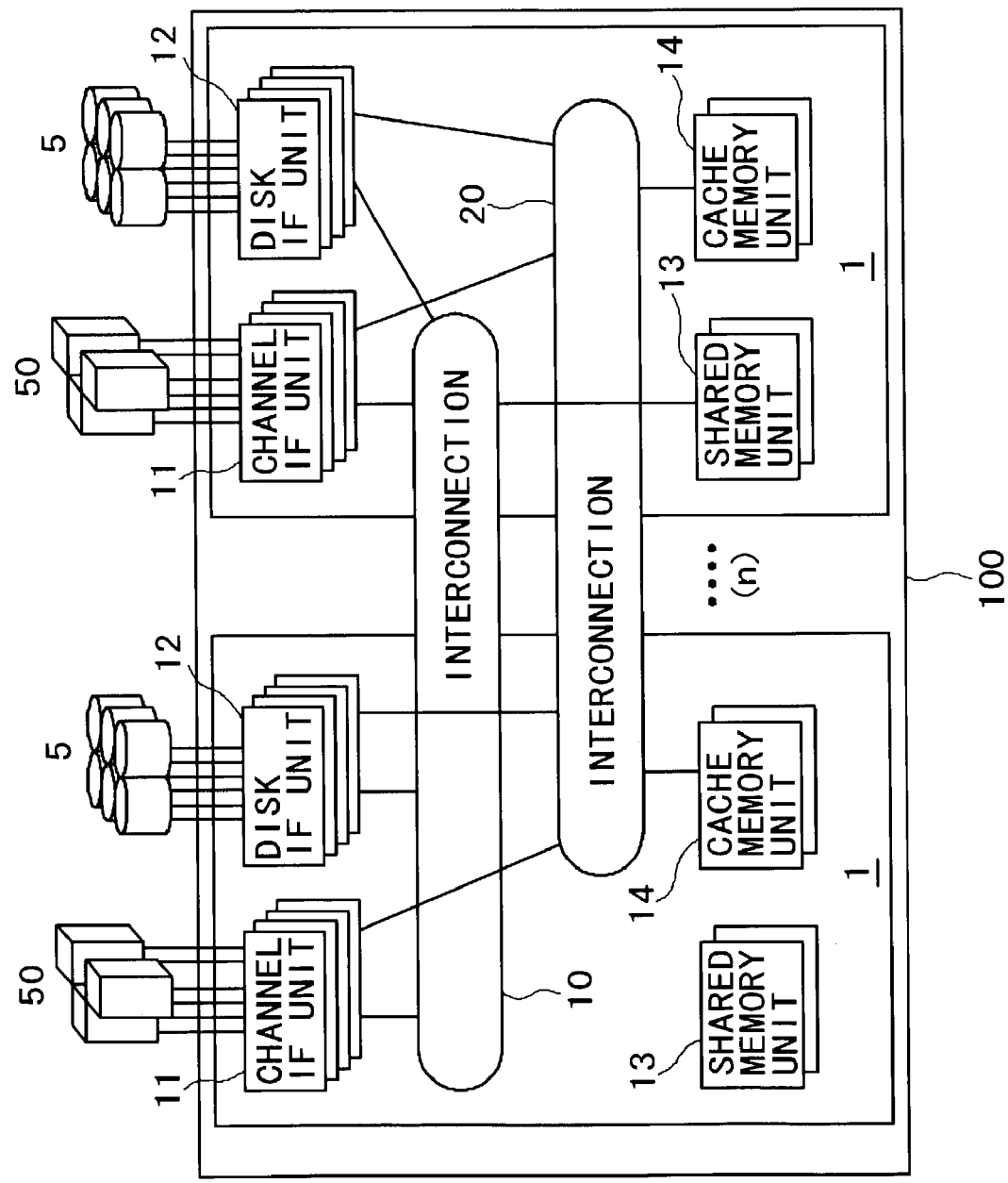
FIG. 2 is a block diagram of a conventional disk array controller.
Figure 3:
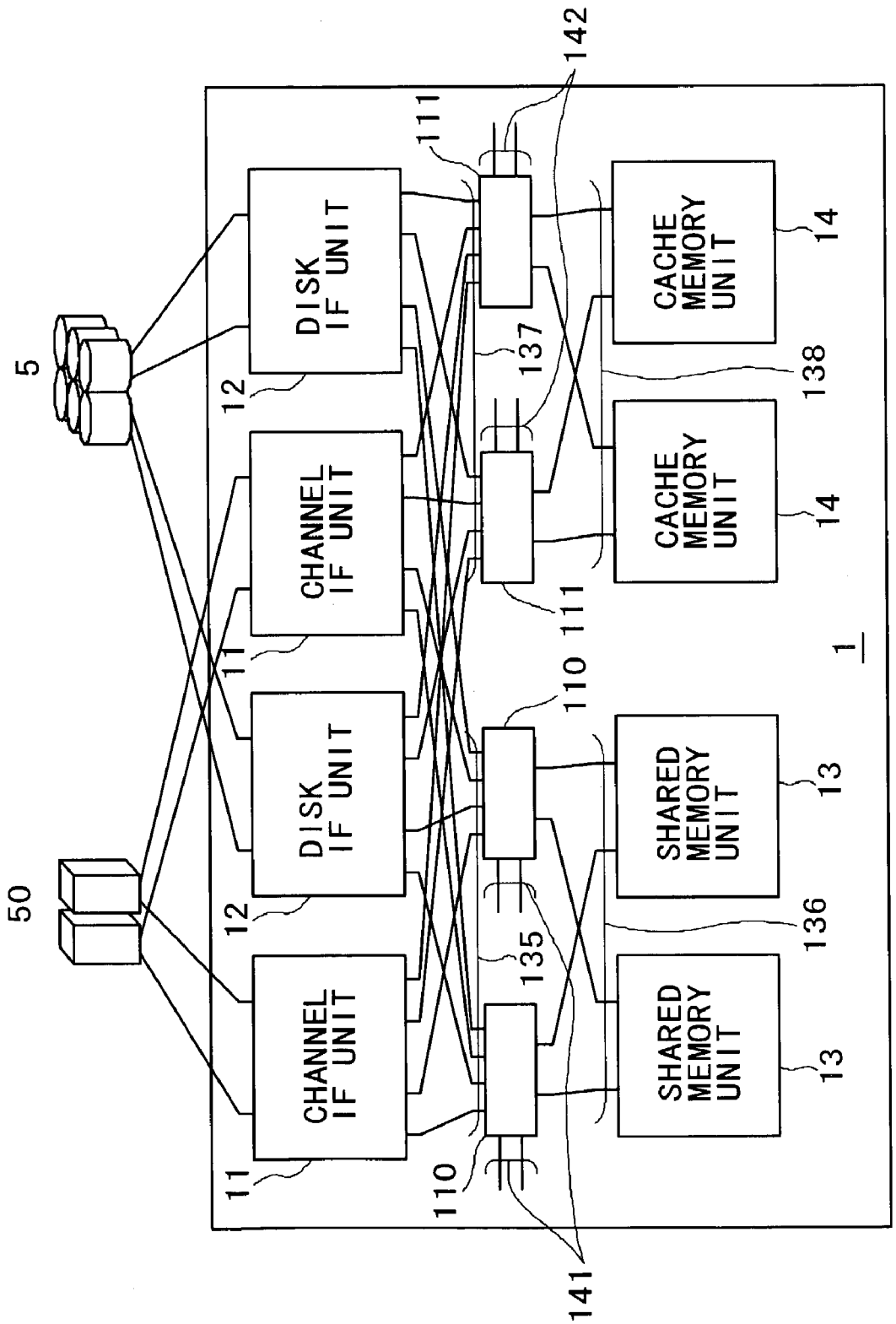
FIG. 3 is another block diagram of the conventional disk array controller.

As shown in FIG. 1, a disk array controller 100 is configured so that it is connected to a plurality of disk array control units 1 through an inter-connection network consisting of the number of connecting switches 2 decided by the number of the controller 100. A disk array control unit 1 comprises a plurality of channel interface (IF) units 11 connected to a plurality of host computers 50; a plurality of disk interface (IF) units 12 connected to a plurality of magnetic disk drives 5; a plurality of shared memory units 13; and a plurality of cache memory units 14. An inter-connection network consisting of a plurality of connecting switches 2 to connect a plurality of disk array control units 1-1 is used for the connection between the channel IF units 11/disk IF units 12 and the shared memory units 13, and another inter-connection network, consisting of a plurality of connecting switches 2 to connect a plurality of disk array control units 1-1, is used for the connection between the channel IF units 11/disk IF units 12 and the cache memory units 14. These two networks used to connect a plurality of disk array control units may be configured independently of each other or united into one.

Figure 4:
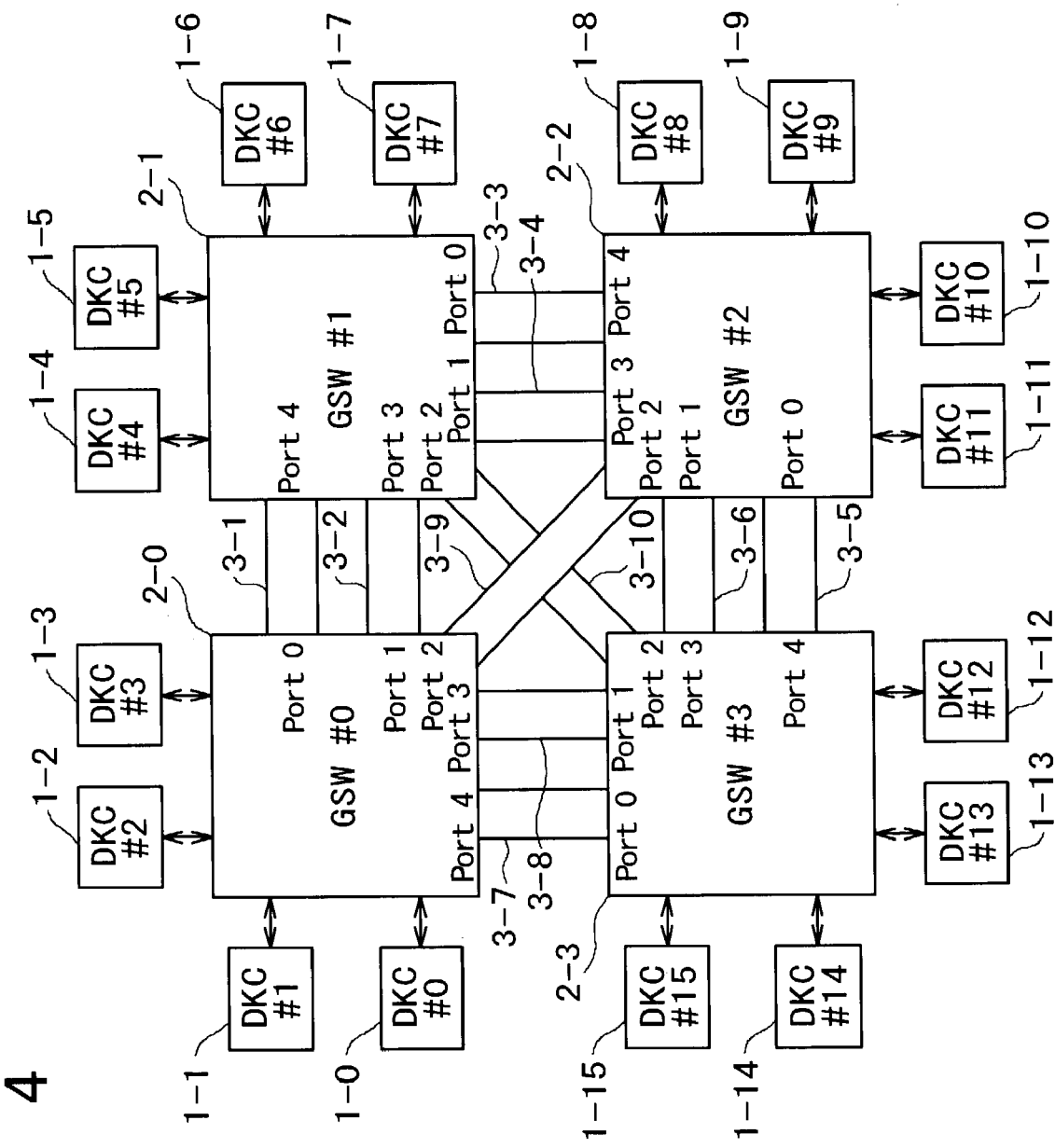
FIG. 4 is still another block diagram of the conventional disk array controller.

FIG. 4 shows an example of how the connecting switches 2 are disposed in an inter-connection network. In FIG. 4, four disk array control units 1 (hereinafter, to be described as the DKC: disk array controller) are connected to a connecting switch 2 (hereinafter, to be described as the GSW: Global Connection Switch) and four GSWs 2 (GSWs 2-0 to 2-3) are connected to each another to configure a disk array controller. Up to 16 DKCs can be connected to one another in one disk array controller. The DKCs 1-0 to 1-3 are connected to the GSW 2-0, the DKCs 1-4 to 1-7 are connected to the GSW 2-1, the DKCs 1-8 to 1-11 are connected to the GSW 2-2, and the DKCs 1-12 to 1-15 are connected to the GSW 2-3, respectively. The GSWs 2-0 to 2-3 are disposed like a matrix and connected to each another.

Each GSW 2 uses five ports (port 0 to port 5) to connect itself to other GSWs 2. The five ports are the minimum number of ports required to secure two redundant paths physically separated between each GSW 2 and other GSWs 2. Each GSW 2 is connected to its adjacent GSWs through inner physical links (3-2, 3-4, 3-6, and 3-8) and outer physical links (3-1, 3-3, 3-5, and 3-7) and both GSW 2-0 and GSW 2-2 and both GSW 2-1 and GSW 2-3 positioned diagonally are connected through the diagonal physical links (3-9 and 3-10).

Figure 5:
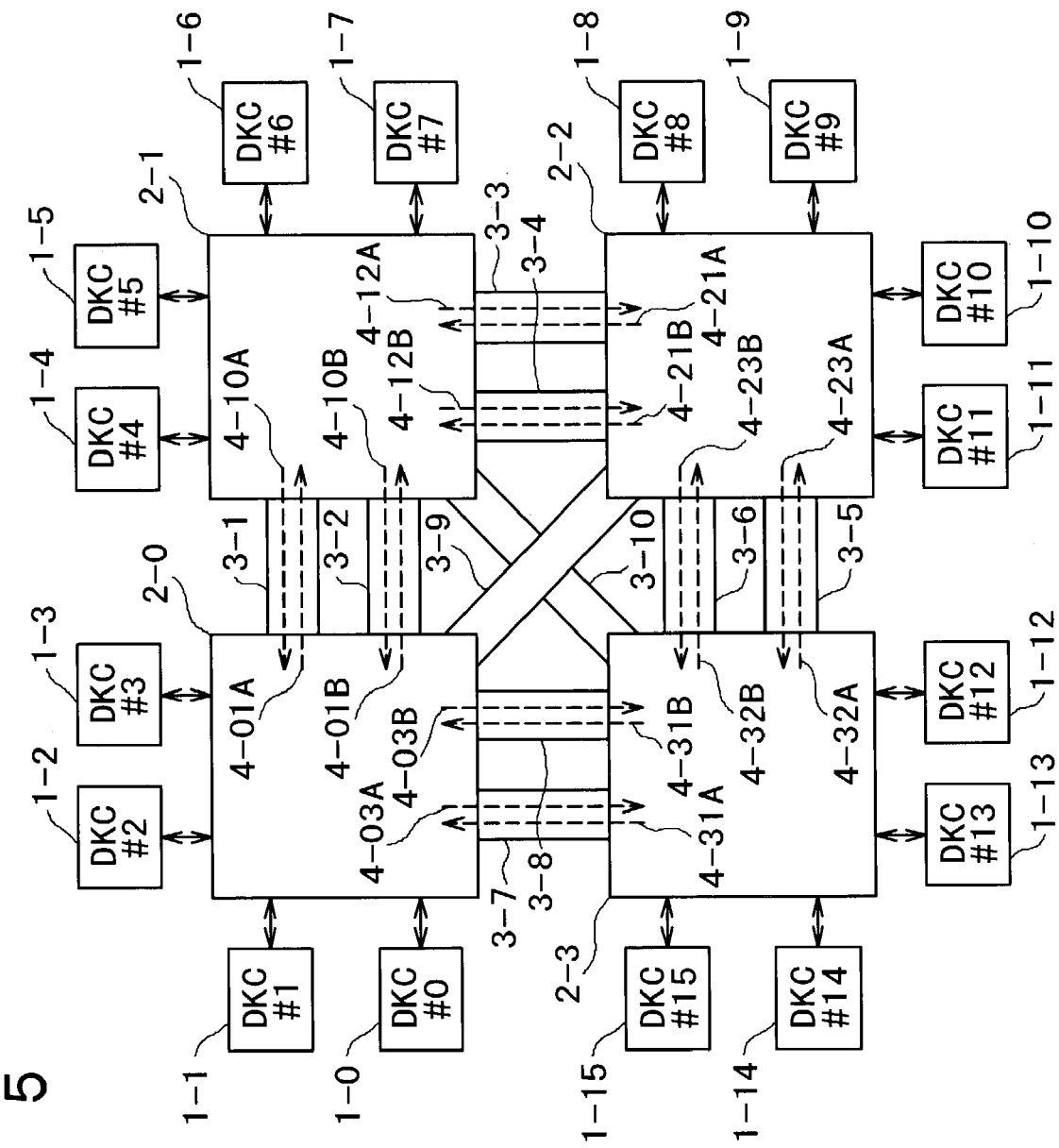
FIG. 5 is another block diagram of the disk array controller in the embodiment of the present invention.

Next, a description will be made concretely for how to set a path for the connection between adjacent GSWs 2 with reference to FIG. 5. For the connection from GSW 2-0 to GSW 2-1, a path 4-01A is set in the physical link 3-1 and a path 4-01B is set in the physical link 3-2. For the connection from GSW 2-1 to GSW 2-0, a path 4-10A is set in the physical link 3-1 and a path 4-10B is set in the physical link 3-2. Because physically separated two paths (redundant paths) are used such way, a path, when its operation is disabled due to a failure, is switched over to another, thereby avoiding service interruptions. Usually, the two paths are used in the following two ways. (1) Only one of the two paths is used in normal operations and it is switched over to another when a trouble occurs in the path. (2) Both of the paths are used to achieve the load balance and when the operation of either of the paths is disabled due to a trouble, it is closed to stop the load balance and only the normal path is used. Although such the two paths are also set between adjacent GSWs just like between GSW 2-0 and GSW 2-1 described above, the description will be omitted here.

Figure 6:
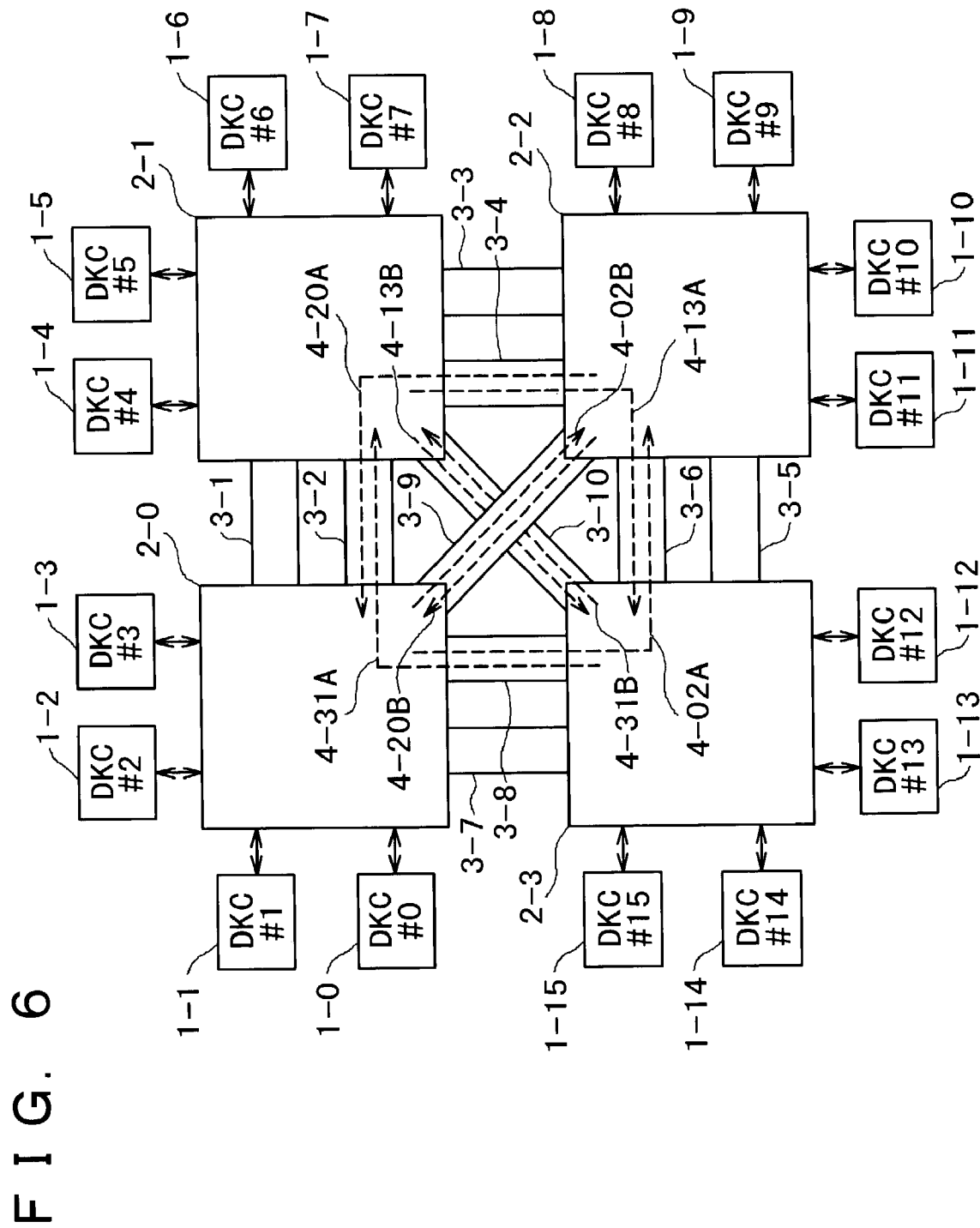
FIG. 6 is still another block diagram of the disk array controller in the embodiment of the disk array controller of the present invention.

Next, a description will be made for how to set a path for the connection between diagonally positioned GSWs with reference to FIG. 6. For the connection from GSW 2-0 to GSW 2-2, a path 4-02A is set in the inner physical links 3-8 and 3-6 and a path 4-02B is set in the diagonal physical link 3-9. For the connection from GSW 2-2 to GSW 2-0, a path 4-20A is set in the inner physical links 3-2 and 3-4 and a path 4-20B is set in the diagonal physical link 3-9. For the connection from GSW 2-1 to GSW 2-3, a path 4-13A is set in the inner physical links 3-4 and 3-6 and a path 4-13B is set in the diagonal physical link 3-10. And, for the connection from GSW 2-3 to GSW 2-1, a path 4-31A is set in the inner physical links 3-2 and 3-8 and a path 4-31B is set in the diagonal physical link 3-10. For the connection between diagonal GSWs 2, one of the redundant two paths takes a 1-hop connection while the other path takes a 2-hop connection through another GSW 2.

Figure 7:
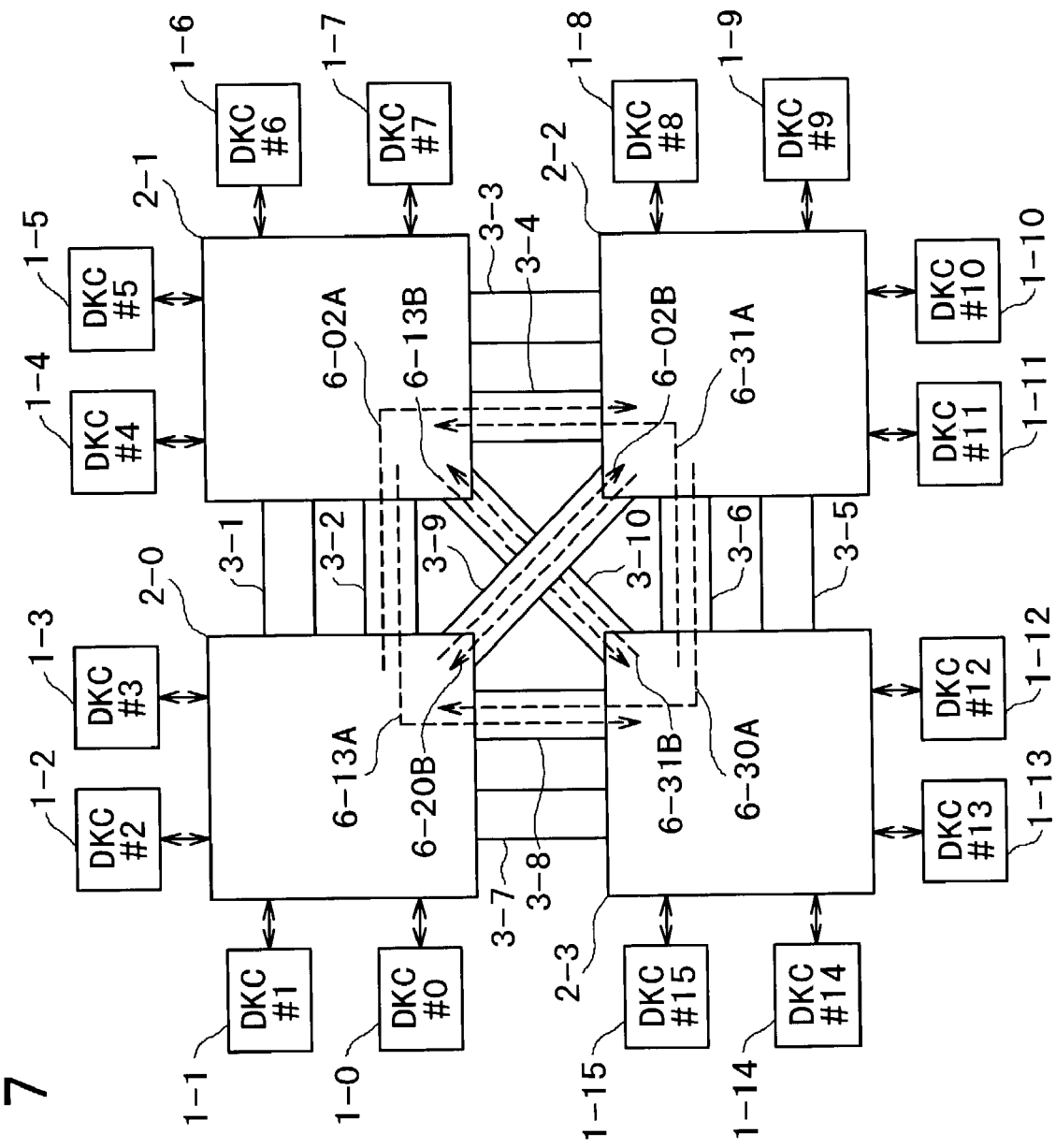
FIG. 7 is a detailed internal block diagram of the disk array control unit shown in FIG. 1.

FIG. 7 shows another example of the connection between diagonal GSWs 2. The path-topology is the same in both FIGS. 6 and 7. In FIGS. 6 and 7, the circumferential direction of the 2-hop path is set oppositely from each other. Such the path setting is achieved by setting a relationship between a desired output destination GSW 2 and its corresponding output port in an output destination table (to be described later) formed in the subject GSW 2.

This completes the description for how to set a path when four GSWs 2 are used in a disk array controller (maximum configuration). Next, how to increase the number of GSWs 2 in a small scale configuration in a scalable manner will be described. Preferably, the current services should not be interrupted at any scale-up/scale-down operation. And, it should also be avoided to change the reliability during the scale-up/down operation.

Figure 8:
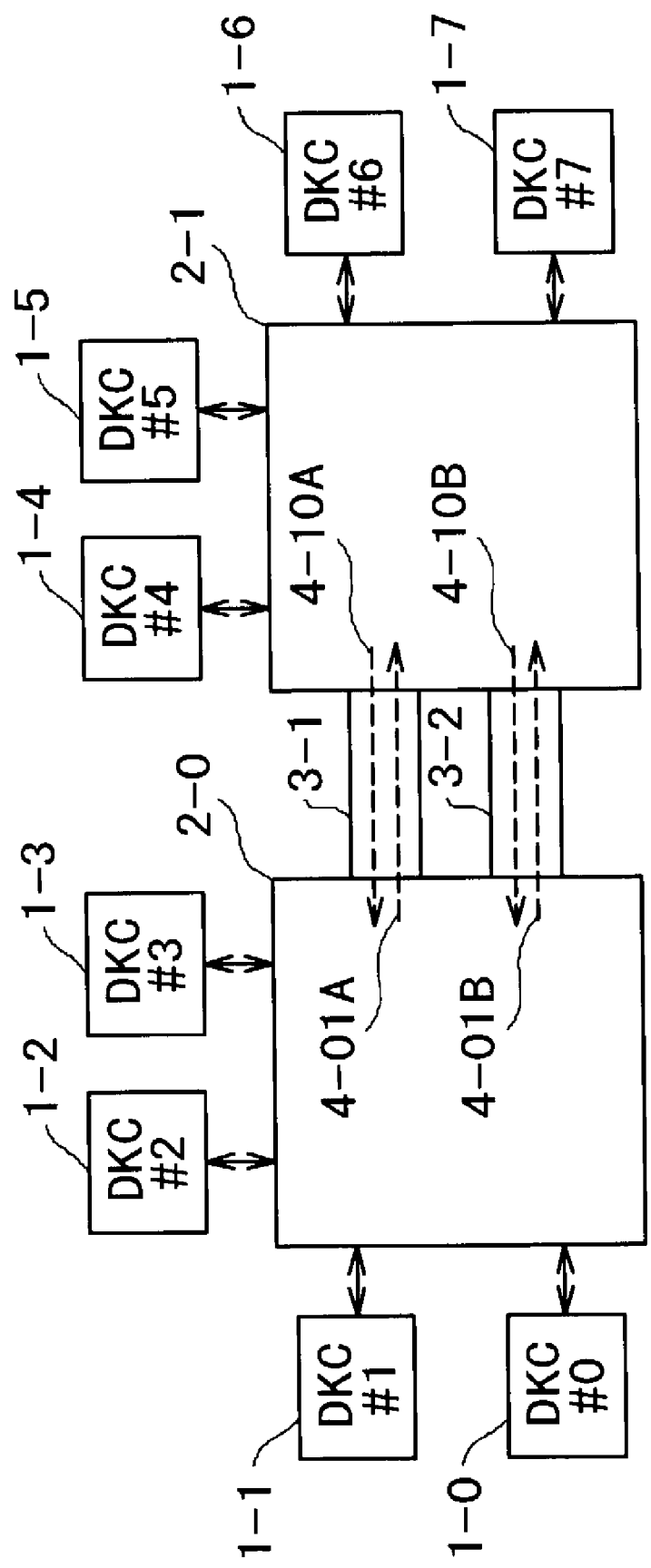
FIG. 8 is a block diagram of the disk array controller to which a plurality of the disk array control units shown in FIG. 7 are connected.

When the number of DKCs 1 are four or less, only one GSW 2 (GSW 2-0 in this example) is installed. When the number of DKCs 1 is 5 and over to 9 (excluded), GSW 2-1 is connected to the GSW 2-0 additionally. FIG. 8 shows a configuration of the disk array controller in which two GSWs (GSW 2-0 and GSW 2-1) are used. In this connection, a bi-directional path is set in the inner physical link 3-1 and in the outer physical link 3-2 respectively, so redundant paths can be set to mutual addresses. In other words, paths 4-01A and 4-10A are set in the outer physical link 3-1 and paths 4-01B and 4-10B are set in the inner physical link 3-2, respectively.

When the number of DKCs 1 increases to 9 and over to 13 (excluded), GSW 2-3 is connected to GSW 2-0 and GSW 2-1 additionally. In this connection, for the connection between adjacent GSW 2-1 and GSW 2-2, a bi-directional path is set in each of the inner physical link 3-3 and the outer physical link 3-4, thereby redundant paths are set to the mutual addresses.

Figure 9:
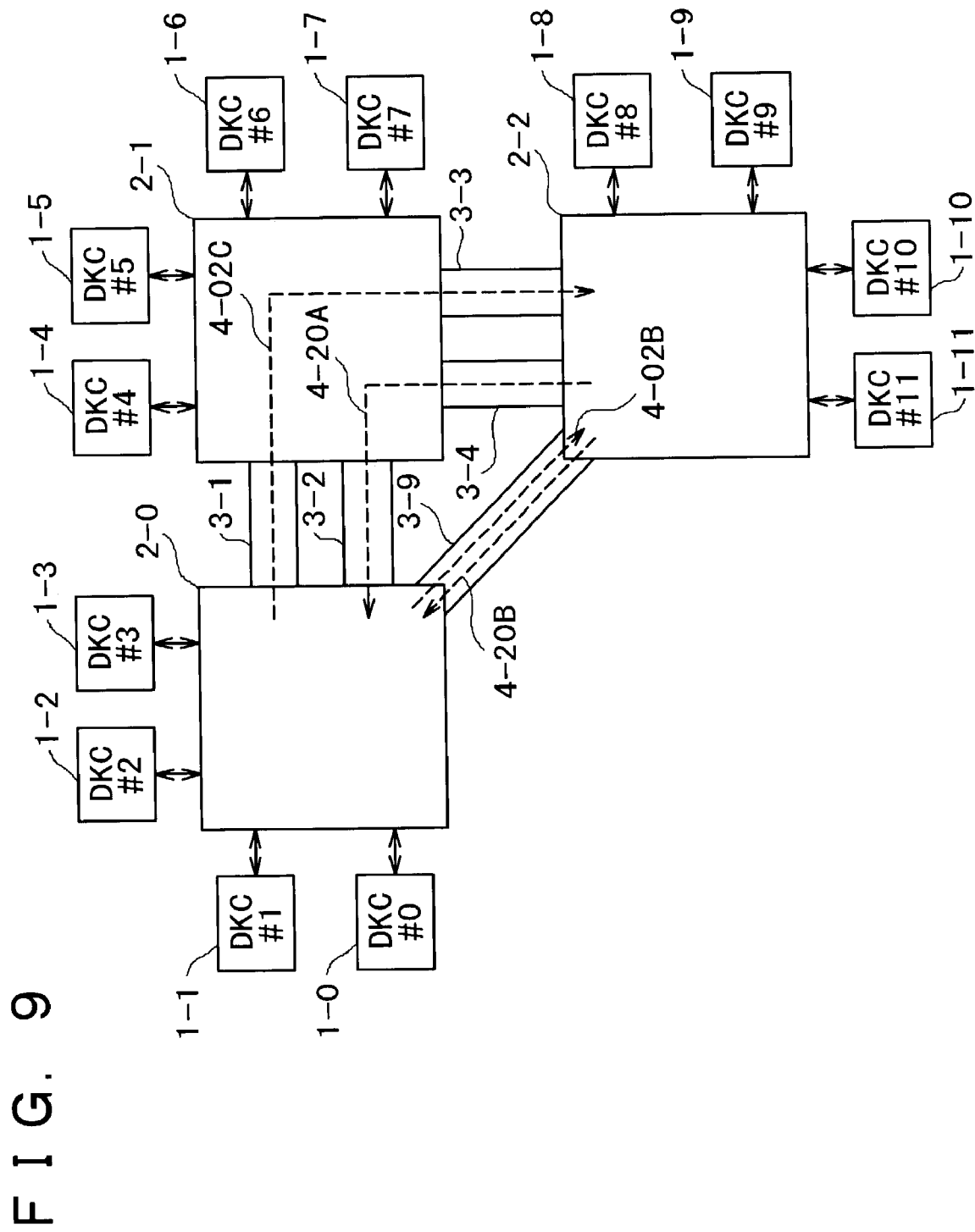
FIG. 9 is a detailed internal block diagram of the disk array control unit shown in FIG. 5.

FIG. 9 shows how a path is set for the connection between diagonal GSW 2-0 and GSW 2-2. In other words, for the connection from GSW 2-0 to GSW 2-2, a path 4-02C is set in each of the outer physical links 3-1 and 3-3 and another path 4-02B is set in the diagonal physical link 3-9. And, for the connection from GSW 2-2 to GSW 2-0, a path 4-20A is set in each of the inner physical links 3-2 and 3-4 and another path 4-20B is set in the diagonal physical link 3-9, thereby redundant paths are set to the mutual addresses. The paths 4-02C and 4-20B may be set oppositely to each other. In any ways, a redundant path is secured for every destination, so that the topology is able to continue service under single point of failure.

When the number of DKCs 1 increases to 13 and over, GSW 2-3 is further connected to GSW 2-0, GSW 2-1, and GWS2-3. In this case, the controller takes the maximum configuration and the paths may be set as shown in FIGS. 5 and 6. When only the connection between diagonal GSWs is required (the configuration shown in FIG. 9 is changed to that shown in FIG. 6), the path 4-02C must be rerouted as a matter of course. Concretely, when GSW 2-3 is added, not only a path is set so as to be connected to GSW 2-3, but also the path 4-02C (connected to GSW 2-2 from GSW 2-0 through GSW 2-1) shown in FIG. 9 is changed to the path 4-02A (connected to GSW 2-2 from GSW 2-0 through GSW 2-2) shown in FIG. 7. To enable this path rerouting, the output destination table retained in the GSW 2 should be configured beforehand so as to be changeable.

FIG. 19 shows an internal block diagram of the GSW 2. The GSW 2 is configured by GSW input ports 23 used to input data from the DKC 1 or another GSW 2; GSW output ports 24 used to output data to the DKC 1 or another GSW 2; input buffers 21 used to temporarily store data inputted from the GSW input ports 23 to make error checks; selectors 22 used to select the GSW input port 23 or GSW output port 24; and an output destination table 20. The output destination table 20 can be referred to with respect to every input data.

The output destination table 20 stores output target GSWs 2, output destination port numbers corresponding to those GSWs, and VALID flags, each used for denoting whether the subject set port number is valid or invalid.

Figure 10:
FIG. 10 is a block diagram of the disk array controller to which a plurality of the disk array control units shown in FIG. 9 are connected.

Hereunder, how to change the set items in the output destination table 20 will be described with reference to FIG. 10. The configuration of the output destination table 20 of the GSW 2-0 is shown at the left side (20-1) in FIG. 10. In FIG. 10, it is premised that GSWs are disposed as shown in FIG. 9. For the connection to the adjacent GSW 2-1, the port 0 (link 3-1) and the port 1 (link 3-2) in FIG. 4 are used. For the connection to the diagonal GSW 2-2, the port 0 (link 3-1) and the port 2 (link 3-9) in FIG. 4 are used. The VALID flag for each of the ports is set at "1" (valid).

The output destination table 20 stores rerouting paths to reach GSW 2-2 through GSW 2-3. At this time, however, because the adjacent GSW 2-3 is not used, all the VALID flags for the adjacent connections to GSW 2-3 are set at "0" (invalid). On the other hand, the configuration 20-1 of the output destination table 20, when GSW 2-3 is added (as shown in FIGS. 5 and 6), is shown at the right side in FIG. 10. At this time, the VALID flags of the ports 3 (link 3-8) and 4 (link 3-7) are set at "1" (valid) respectively in correspondence with the connection of the newly added adjacent GSW 2-3. The VALID flag of the port 0 (link 3-1) used for the connection to the diagonal GSW 2-2 is updated so that the port 3 (link 3-8) is used for the diagonal connection.

Figure 11:
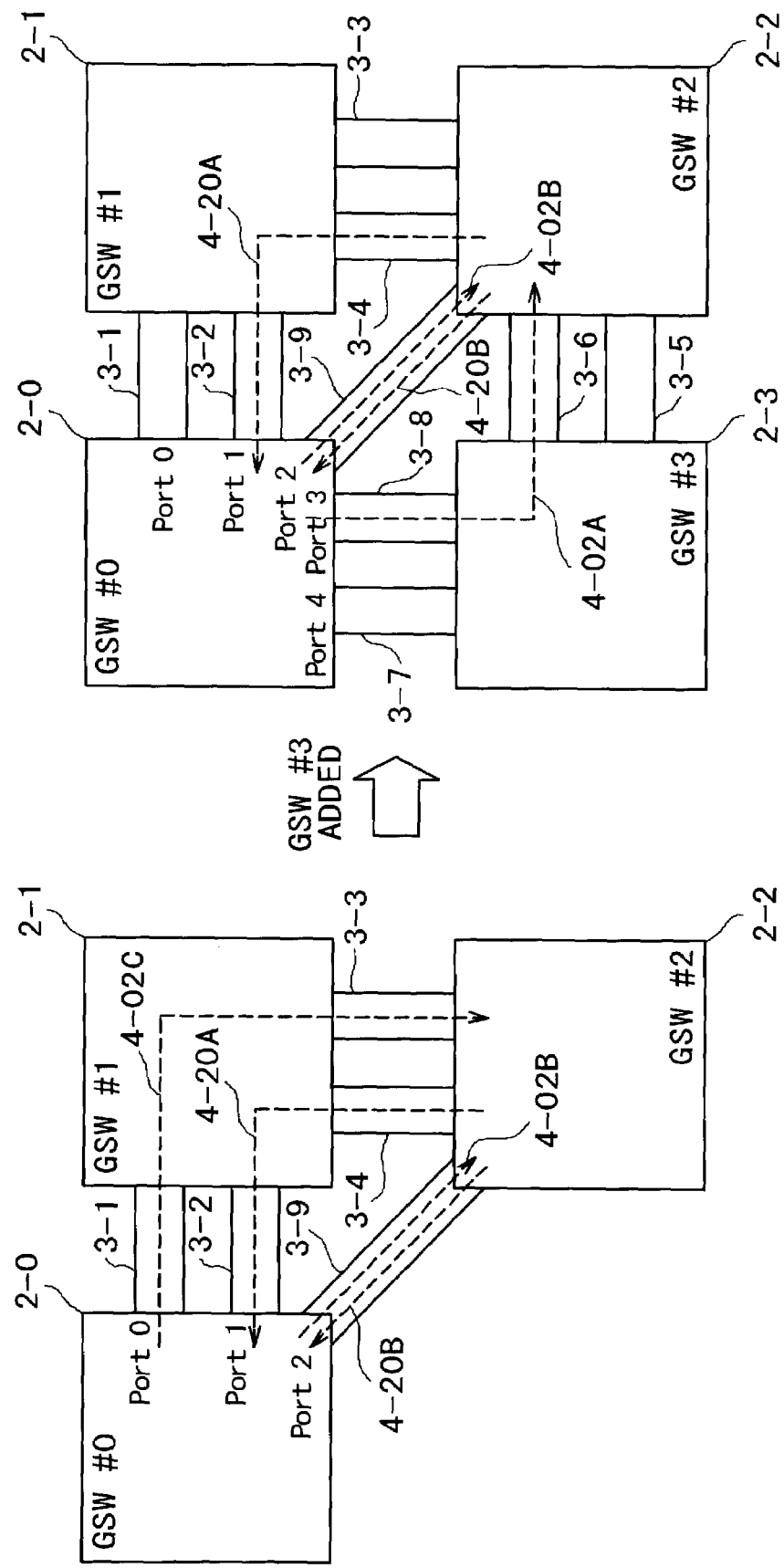
FIG. 11 is a detailed internal block diagram of the disk array control unit shown in FIG. 6.

FIG. 11 shows how GSWs are added and the path setting is changed in accordance with the updating of the output destination table 20 shown in FIG. 10 (only the path set for the connection between GSW 2-0 and GSW 2-2 that are diagonally positioned to each other is shown here). More concretely, the port 3 (link 3-8) setting is validated to prevent service interruptions, then the current port 0 (link 3-1) setting is invalidated a certain time later. In this way, service interruption can be avoided by updating the output destination table 20 when any GSW 2 is added to the controller. To decrease the number of GSWs 2, the above procedure is reversed; service interruptions are also avoided in the same way. The output destination table 20 can be set/updated through a management terminal (not shown) connected to (or part of) a disk array controller. It is also possible for each GSW 2 to set its output destination table 20 autonomously when its connection is recognized.

Next, a description will be made for a configuration of the disk array controller preferred for increasing the number of GSWs 2 in another embodiment of the present invention.

Figure 12:
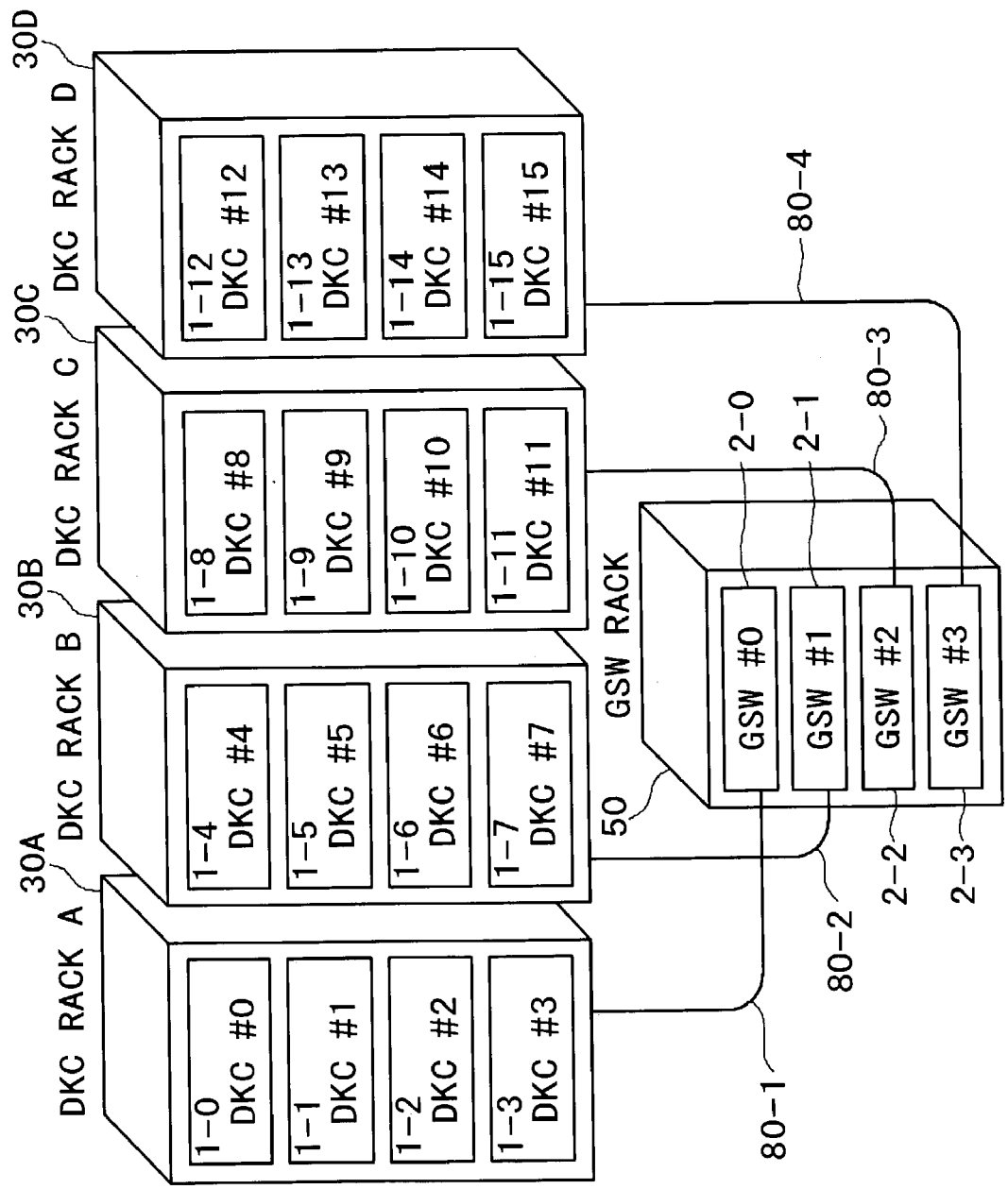
FIG. 12 is a block diagram of the disk array controller to which a plurality of disk array control units shown in FIG. 11 are connected.
Figure 15:
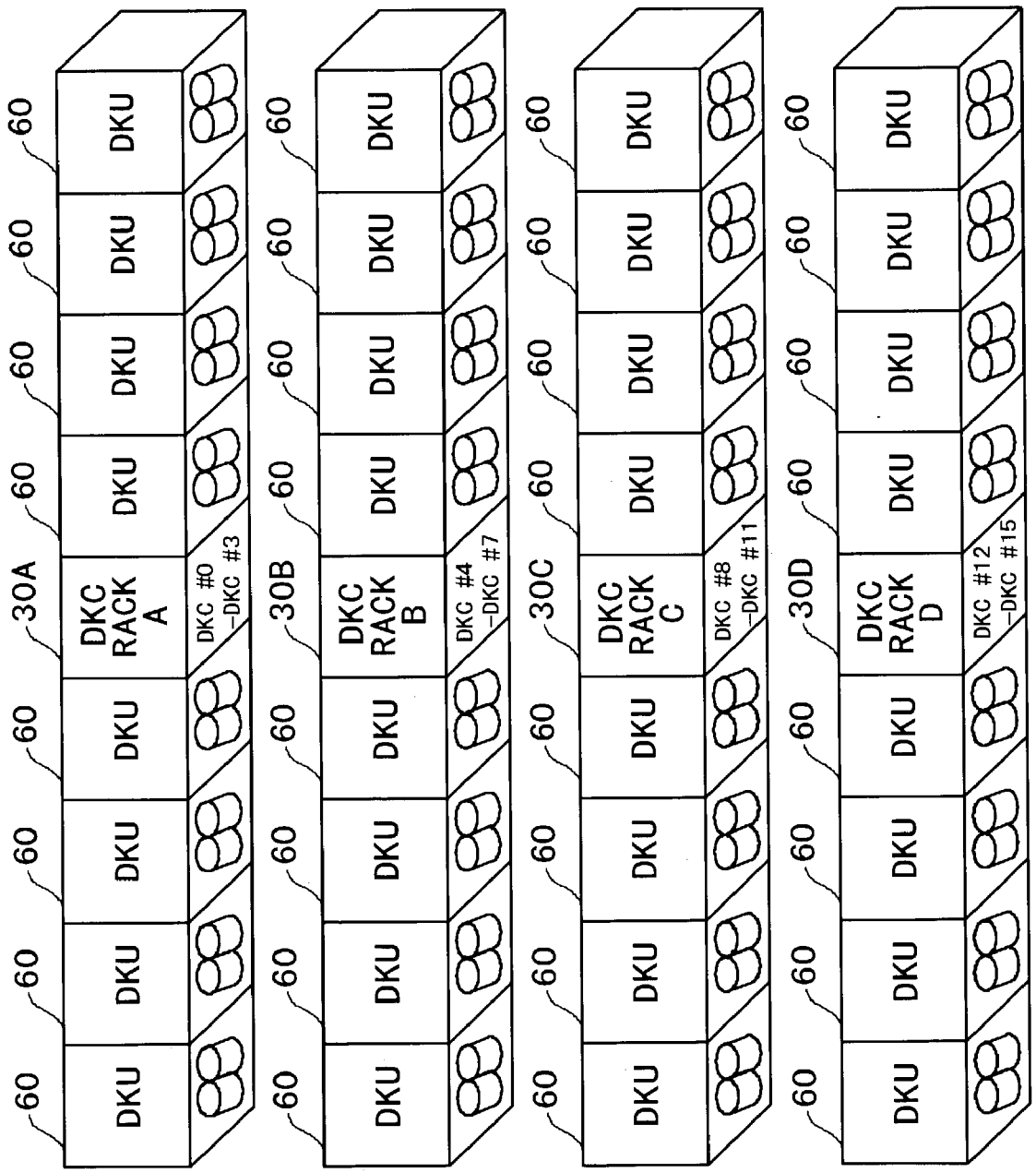
FIG. 15 illustrates how a plurality of racks in which disk array control units are housed respectively are connected to each another in the embodiment of the present invention.

In FIG. 12, four DKCs 1 are housed in each DKC rack 30. Concretely, DKCs 1-0 to 1-3 are housed in the DKC rack 30-A, DKCs 1-4 to 1-7 are housed in the DKC rack 30-B, DKCs 1-8 to 1-11 are housed in the DKC rack 30-C, and DKCs 1-12 to 1-15 are housed in the DKC rack 30-D. The four DKC racks 30 are connected to the GSWs 2-0 to 2-3 housed in the GSW rack 50 through the cables 80-1 to 80-4. A rack back-plane or cable is used for the connection between the ports of the GSWs 2 in the GSW rack 50. Practically, the GSWs 2 should not be housed in the GSW rack 50, since their dispositions therein are to be limited; because a plurality of disk units (hereinafter, to be described as DKUs) 60 are connected to each DKC rack 30, when a plurality of DKC racks 30 are used, they come to be disposed as shown in FIG. 15. Each DKU 60 connected to a DKC rack 30 has many magnetic disks controlled by each DKC 1. When those DKUs 50 are disposed such way, the connection between a DKC rack 30 and a GSW rack 50 comes to require a longer cable connection than the distance between the two DKC racks 30 in some portions wherever the GSW rack 50 is placed. To avoid this problem, the GSWs 2 are disposed at random in the DKC rack as shown in FIG. 13, thereby the GSW rack 50 can be disposed in any place and the cable length between the DKC racks becomes shorter.

In FIG. 13, the DKC racks 30A and 30D are disposed as shown in FIG. 12 and GSW 2-0 and GSW 2-1 are loaded in GSW slots 31 in the DKC rack 30B while GSW 2-2 and GSW 2-3 are housed in the DKC rack 30C. The DKC racks 30B and 30C are disposed adjacently. And, in another rack, each GSW 2 is connected to another through one of the cables 80-5 to 80-10. Then, the DKC rack 30A is disposed outside the DKC rack 30B and the DKC rack 30D is disposed outside the DKC rack 30C so as to make their cables shorter than the distance between two DKC racks.

Figure 14:
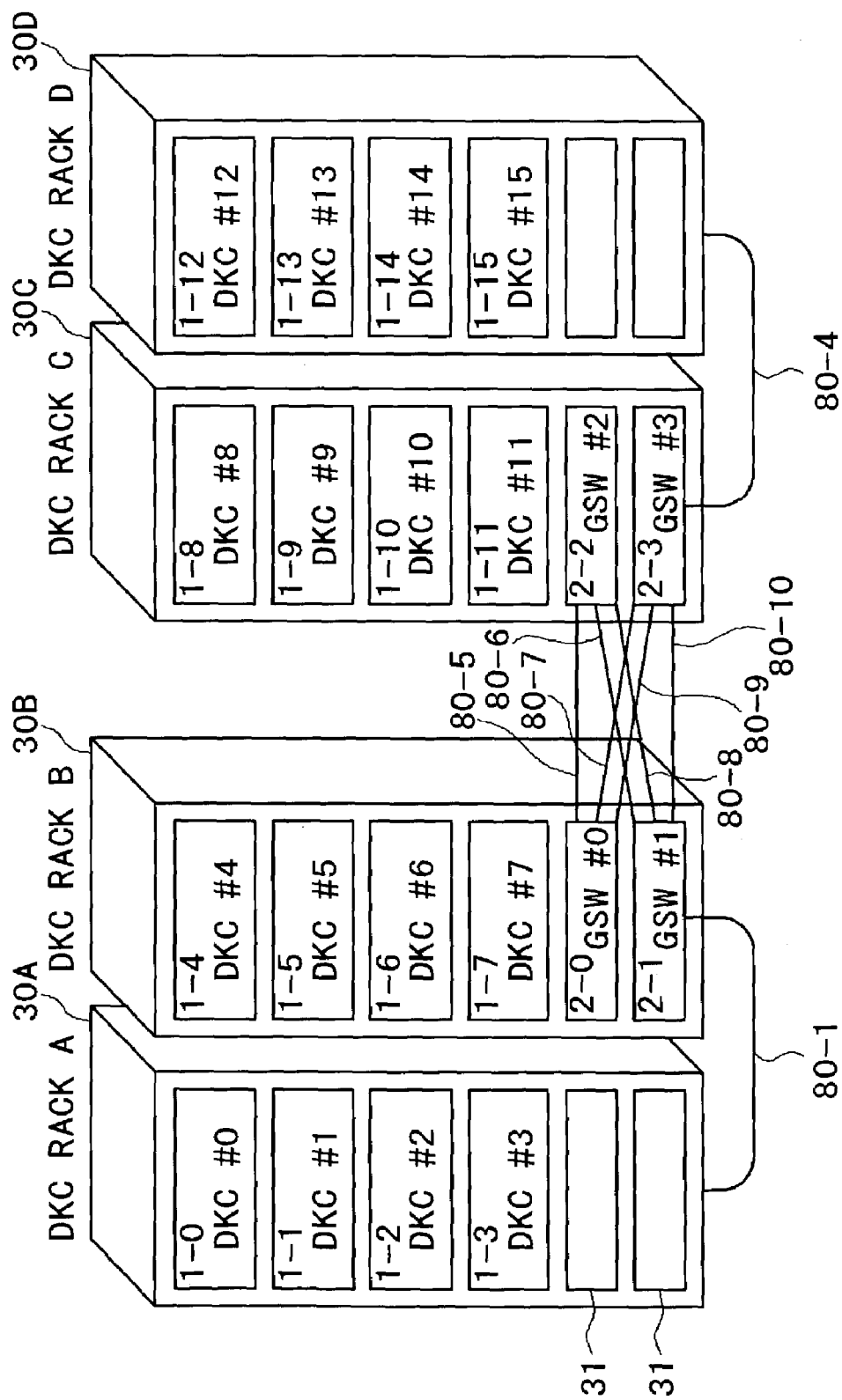
FIG. 14 illustrates how the disk array control units of the present invention are housed in racks.

FIG. 14 shows an example in which every DKC rack is configured so as to be enabled to house GSWs 2. In this connection, the GSW 2 slots 31 for the DKC racks 30A and 30D become empty. An advantage of this configuration that, the configuration just requires development of only one type DKC racks 30.

Figure 16:
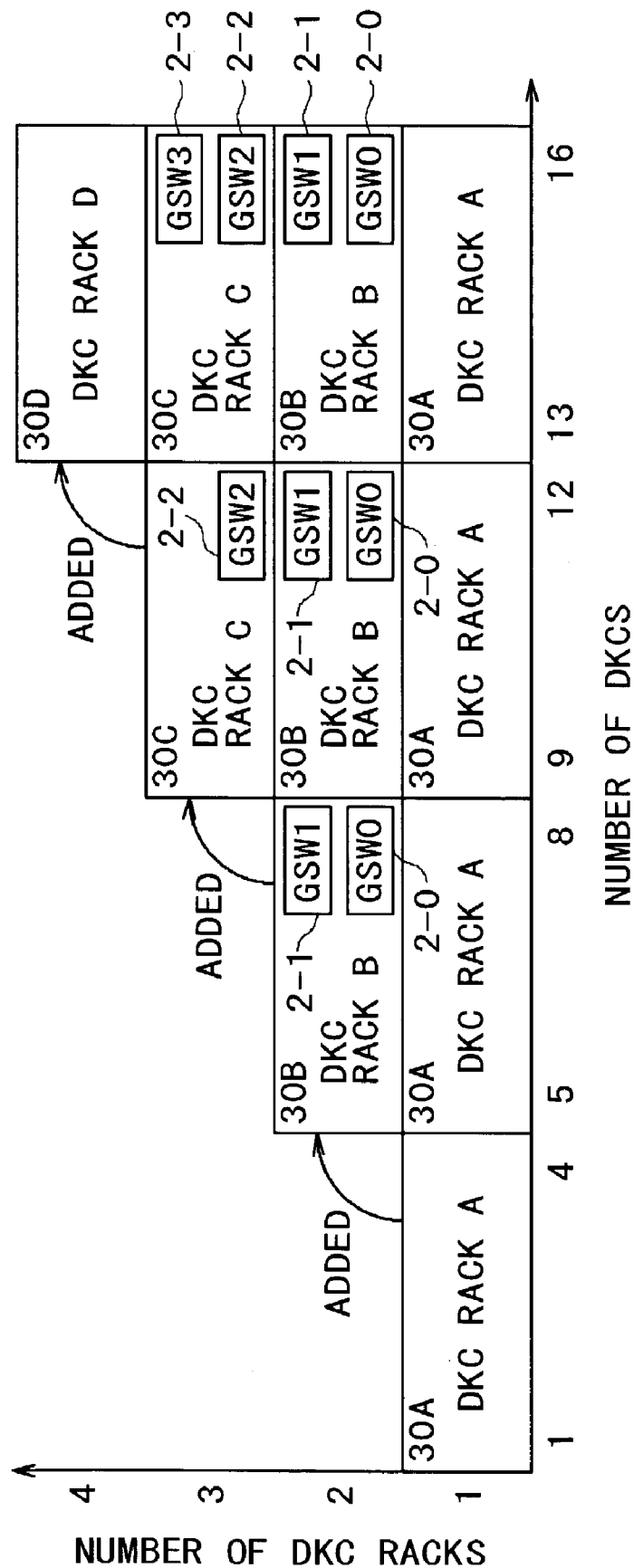
FIG. 16 illustrates the scalability of the disk array control unit racks and switch cards in the embodiment of the present invention.

FIG. 16 shows a relationship between the number of GSWs 1 and the number of DKC racks 30 required as a result of the addition of the DKCs 1. When the number of DKC racks 30 increases to two, GSWs 2-0 and 2-1 are housed in the DKC rack 30B. When the number of DKC racks 30 increases to three, the GSW 2-2 is housed in the DKC rack 30C. In addition, when the number of DKC racks 30 increases to four, the GSW 2-3 is housed in the DKC rack 30C. Such way, GSWs 2 are housed in accordance with the number of DKCs 1 and the number of DKC racks. This is why the present invention can provide a cost-scalable disk array controller.

Figure 17:
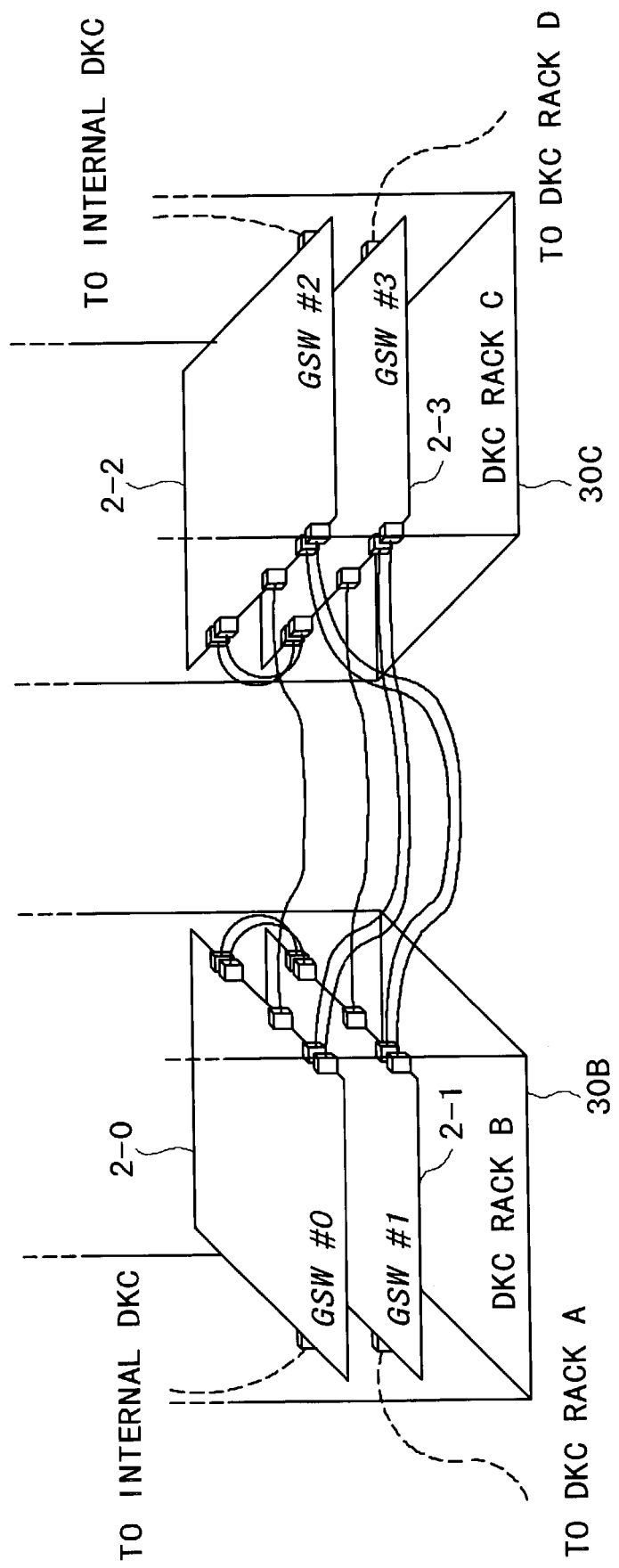
FIG. 17 illustrates how switch cards are housed in the disk array control unit racks in the embodiment of the present invention.

Next, a description will be made for an example of how to make the connection between GSWs 2 housed in the DKC racks 30B and 30D with reference to FIG. 17. At first, the GSW 2-0 and the GSW 2-1 housed in the DKC rack 30B are connected to the GSW 2-2 and the GSW 2-3 housed in the DKC rack 30C through cables led out from the end face of the rack 30C. Then, the GSW 2-0 is connected to the DKC1 housed in the DKC rack 30A through a cable led out from the end face of the rack 30A while the GSW 2-2 is connected to the DKC1 housed in the DKC rack 30D through a cable led out from the end face of a board facing the rack 30D. In FIG. 17, while cables are used for the connection between the GSWs in the same DKC rack, that is, between GSW 2-0 and GSW 2-1, as well as between GSW 2-2 and GSW 2-3, a back-plane may also be used for the connection. And, while cables are used for the connection between GSW and DKC in the same DKC rack, a back-plane may also be used for the connection. Such the connection shortens the necessary cable length between DKC racks 30.

Figure 18:
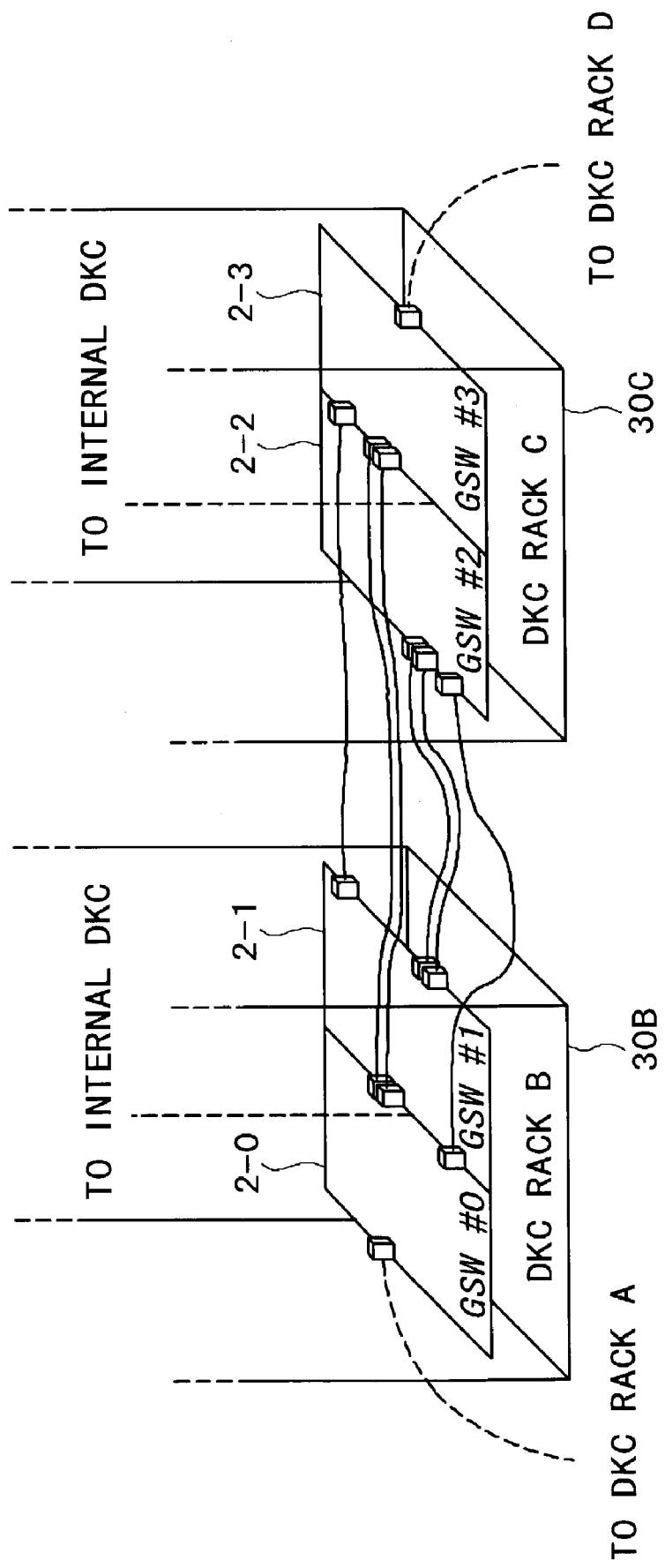
FIG. 18 illustrates how switch cards are housed in the disk array control unit racks in the embodiment of the present invention.

FIG. 18 shows another example of the connection between GSWs in a DKC rack and between GSW and DKC in the GSW rack. The connection between GSWs in the same DKC rack, as well as the connection between such a GSW and a DKC in the GSW rack may be done with use of a middle plane as shown in FIG. 18. The GSW2 card may be a half-size one, so that GSWs 2 are loaded in the slot from both sides. In such a case, the GSW2 board cost, as well as the number of slots can be reduced compared to the GSW2 card shown in FIG. 17. The DKC rack 30 thus becomes more compact in size.

What is claimed is:

1. A disk array controller comprising a plurality of disk array control units, wherein each of said plurality of disk array control units includes:

a channel interface unit having an interface with a host computer;

a disk interface unit having an interface with a magnetic disk drive; and a cache memory unit for storing data read/to be written from/in said magnetic disk drive; and means for connecting both said channel interface unit and said disk interface unit to said cache memory unit;

wherein said channel interface unit transfers data between an interface of said host computer and said cache memory unit in response to a data read/write request from said host computer while said disk interface unit transfers data between said magnetic disk drive and said cache memory unit, thereby allowing said disk array control unit to read/write data;

wherein said connecting means used for the connection among said plurality of disk array control units is configured by a plurality of switches to be increased in a scalable manner and each of said plurality of switches has an output destination path table and a path selector used to form a logical mesh connection path to/from another switch and reform the path-topology of said logical mesh connection when a switch is added to said means for connecting;

wherein each of said plurality of switches is provided with the minimum necessary number of ports by merging a plurality of paths corresponding to said plurality of switches and setting them in the same physical path so as to form a logical mesh connection path from each of said switches to other switches with a redundant path having a separated physical route; and wherein when four of said switches are to be connected to said means for connecting said plurality of disk array control units and disposed like a matrix, each of said four switches having five switch connection ports and being connected to its adjacent switches through two direct-connection physical ports to form a redundant path thereto while each of said switches is connected to its diagonal switches through a direct connection physical port respectively and through an adjacent switch by sharing one of said two direct-connection physical ports with said adjacent switch to form a redundant path.

2. The disk array controller according to claim 1, wherein said controller further includes:

a shared memory unit for storing control information related to the data transfer between said channel interface unit/disk interface unit and said cache memory unit, as well as management information of said magnetic disk drive; and means used for the connection between said channel interface unit/disk interface unit and said shared memory unit.

3. The disk array controller according to claim 2, wherein each of said means used for the connection between said channel interface unit/disk interface unit and said cache memory unit and said means used for the connection between said channel interface unit/disk interface unit and said shared memory unit is configured by a plurality of switches to be increased in a scalable manner; and wherein each of said plurality of switches has an output destination path table and a selector used to form a logical mesh connection path with a redundant path having a separated physical route between switches and reform the path-topology of said logical mesh connection path when a switch is added to said means for connecting.

4. A method for adding said disk array control unit to said disk array controller according to claim 1, wherein said method connects a rack that houses said plurality of disk array control units, the switch added to said means for connecting is added to the rack that houses said plurality of disk array control units and a plurality of switches for connecting said plurality of disk array control units through cables.

5. A method for adding said disk array unit to said disk array controller according to claim 1, wherein, when there are four racks for housing said plurality of disk array control units, two of the four racks are used for housing said plurality of disk array control units and the other two racks are used for housing said plurality of disk array control units and a plurality of switches for connecting said disk array control units, then the former two racks are connected to the latter two racks through cables.

6. A method for adding said disk array control unit according to claim 1, wherein each of two racks used to house said plurality of disk array control units houses two of said switches and each of said two switches is connected to other three switches through cables.

7. A method for adding said disk array control unit according to claim 1, wherein each of two racks used to house said plurality of disk array control units houses two of said switches and each of said two switches is connected to said switches in the same rack through back-planes and is connected to said switches in the other rack through cables.

8. A disk array controller comprising a plurality of disk array control units, wherein each of said plurality of disk array control units includes:

a channel interface unit having an interface with a host computer;

a disk interface unit having an interface with a magnetic disk drive; and a cache memory unit for storing data read/to be written from/in said magnetic disk drive; and means for connecting said channel interface unit and said disk interface unit to said cache memory unit;

wherein said channel interface unit transfers data between an interface of said host computer and said cache memory unit in response to a data read/write request from said host computer while said disk interface unit transfers data between said magnetic disk drive and said cache memory unit, thereby allowing said disk array control unit to read/write data;

wherein said connecting means used for the connection among said plurality of disk array control units is configured by a plurality of switches to be increased in a scalable manner and each of said plurality of switches has an output destination path table and a path selector used to form a logical mesh connection path from each of said switches to other switches with a redundant path having a separated physical route and reform the path-topology of said logical mesh connection path when a switch is added to said means for connecting; and wherein when four of said switches are to be connected to said means for connecting said plurality of disk array control units and disposed like a matrix, each of said four switches having five switch connection ports and being connected to its adjacent switches through two direct-connection physical ports to form a redundant path thereto while each of said switches is connected to its diagonal switches through a direct connection physical port respectively and through an adjacent switch by sharing one of said two direct-connection physical ports with said adjacent switch to form a redundant path.

9. A method for adding said disk array control unit to said disk array controller according to claim 8, wherein said method connects a rack that houses said plurality of disk array control units, the switch added to said means for connecting is added to the rack that houses said plurality of disk array control units and a plurality of switches for connecting said plurality of disk array control units through cables.

10. A method for adding said disk array unit to said disk array controller according to claim 8, wherein, when there are four racks for housing said plurality of disk array control units, two of the four racks are used for housing said plurality of disk array control units and the other two racks are used for housing said plurality of disk array control units and a plurality of switches for connecting said disk array control units, then the former two racks are connected to the latter two racks through cables.

11. A method for adding said disk array control unit according to claim 8, wherein each of two racks used to house said plurality of disk array control units houses two of said switches and each of said two switches is connected to other three switches through cables.

12. A method for adding said disk array control unit according to claim 8, wherein each of two racks used to house said plurality of disk array control units houses two of said switches and each of said two switches is connected to said switches in the same rack through back-planes and is connected to said switches in the other rack through cables.

* * * * *